US008426773B2

(12) United States Patent
Willenkamp et al.

(10) Patent No.: US 8,426,773 B2
(45) Date of Patent: Apr. 23, 2013

(54) DUAL POWER PIN CONNECTOR ASSEMBLY FOR A MIG WELDING MACHINE

(75) Inventors: Robert Willenkamp, Appleton, WI (US); Scott Rozmarynowski, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1457 days.

(21) Appl. No.: 12/038,550

(22) Filed: Feb. 27, 2008

(65) Prior Publication Data

US 2009/0212034 A1     Aug. 27, 2009

(51) Int. Cl.
*B23K 9/09* (2006.01)
*B23K 9/10* (2006.01)
*B23K 9/12* (2006.01)

(52) U.S. Cl.
USPC ............ 219/137 PS; 219/137.63; 219/137.31

(58) Field of Classification Search .............. 219/137 R, 219/137 PS, 137.44, 137.31, 137.2, 137.63, 219/137.9, 541, 130.1–130.5, 136; 439/165, 439/131, 756–758, 764, 799
See application file for complete search history.

(56) References Cited

U.S. PATENT DOCUMENTS

| | | | | |
|---|---|---|---|---|
| 2,966,291 | A * | 12/1960 | Anderson | 226/2 |
| 4,892,990 | A * | 1/1990 | Acheson | 219/76.14 |
| 4,939,339 | A * | 7/1990 | Folkening et al. | 219/137.63 |
| 6,204,476 | B1 * | 3/2001 | Reynolds et al. | 219/130.51 |
| 6,773,310 | B2 * | 8/2004 | Davis | 439/773 |
| 6,855,914 | B1 * | 2/2005 | Kaufman et al. | 219/137.71 |
| 7,077,681 | B2 * | 7/2006 | Behoo | 439/333 |
| 7,208,699 | B2 * | 4/2007 | Stanzel | 219/137.63 |
| 2005/0224484 | A1 * | 10/2005 | Matiash | 219/137.2 |
| 2006/0169685 | A1 * | 8/2006 | Stanzel | 219/137.31 |
| 2006/0237409 | A1 * | 10/2006 | Uecker et al. | 219/130.5 |
| 2007/0051711 | A1 * | 3/2007 | Kachline | 219/130.01 |
| 2007/0151965 | A1 * | 7/2007 | Mormino | 219/137.2 |
| 2007/0158313 | A1 * | 7/2007 | Stanzel | 219/74 |

OTHER PUBLICATIONS

PCT International Search Report, PCT/US2008/086935.

* cited by examiner

*Primary Examiner* — M. Alexandra Elve
*Assistant Examiner* — Hemant Mathew
(74) *Attorney, Agent, or Firm* — Quarles & Brady LLP

(57) ABSTRACT

A dual power pin connector assembly for connecting both a MIG welding gun and a spoolgun to a welding machine. The dual power pin connector is comprised of a busbar portion that electrically and mechanically couples the positive output terminal of the welding machine power supply to a wire drive for the MIG welding gun. The connector is further comprised of an integral quick release assembly/clamping portion that electrically and mechanically connects the positive power supply terminal to a power supply cable for the spoolgun. The clamping portion receives and retains a power pin coupled to one end of the spoolgun power cable in a receptacle that is manually tightened and loosened.

5 Claims, 4 Drawing Sheets

DUAL POWER PIN CONNECTOR ASSEMBLY FOR A MIG WELDING MACHINE

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to welding-type systems and, more particularly, to an apparatus that provides welding-type power to a MIG welding gun while also providing a quick and easy means for supplying welding-type power to a spoolgun.

There are many welding-type systems used for a variety of applications. The term "welding-type systems", as used herein, includes arc welding systems, plasma cutting systems, and induction heating systems. Accordingly, the term "welding-type power", as used herein, may refer to welding, plasma cutting, or induction heating power. One primary component of all welding-type systems is a power supply that delivers conditioned welding-type power to perform a specific welding-type process.

Some welding-type applications, such as steel arc welding, utilize a motor driven wire feeder, or wire drive, that delivers a consumable wire electrode to a welding gun, or torch, to perform a desired welding-type process, such as MIG welding. One common type of wire drive is a voltage sensing wire drive. Voltage sensing wire drives are typically connected, via a cable, to the positive terminal of a welding-type power supply. The wire drive is further coupled to the consumable wire electrode. The negative terminal of the power supply is connected to a workpiece such that when the positive wire electrode is close enough to the negative work piece to create an arc, a desired welding process occurs. Generally, voltage sensing wire drives become active when the voltage and/or current provided by an associated power supply increases above a threshold value. In this regard, the wire drive does not typically receive control signals or communicate with the power supply.

In other welding-type applications, for example, MIG welding with a consumable aluminum wire electrode, the standard wire drive may not be suitable. For instance, when MIG welding with aluminum wire, special equipment adapted specifically to handle the softer wire must be used. Aluminum wire electrodes can easily be damaged by equipment otherwise acceptable for steel wire electrodes.

One type of equipment suitable for aluminum welding is known as a spoolgun. The spoolgun is a self-contained welding gun equipped to feed a soft wire electrode from a small spool mounted directly on the gun. The distance from the wire to the contact tip is very short, usually less than twelve inches and therefore is better able to feed the soft aluminum wire electrode without problems. A spoolgun power supply cable, typically up to 50 feet in length, is run between the welding power supply and the spoolgun.

Users that switch frequently between steel and aluminum welding often find it convenient and cost-effective to purchase and use a single welding machine that is able to drive both a spool gun and a standard MIG gun. Some existing welding machines are configured such that a MIG gun and a spoolgun may be connected to the welding machine at the same time.

Referring now to FIG. 1, one such prior art welding machine 10 is shown. The welding machine 10 is powered by a switched or inverter-based power supply 12 contained within a housing 14. A pair of welding-power output terminals 16, 18 extend from the housing 14. The welding machine 10 further includes a power input connection (not shown) that receives AC power, such as that received from a standard power receptacle. As is known in the art, the supply power is rectified and conditioned, thereby converting the incoming AC power to a DC welding-type power.

As shown, the welding machine 10 is connected to a standard MIG welding gun, or torch, 20 that delivers a consumable wire electrode 22 to effectuate a welding-type operation. The wire electrode 22 is electrically connected to the positive welding power terminal 16, as described in greater detail below, while a work piece 24, upon which a welding-type operation will occur, is electrically connected to the negative welding power output terminal 18 via a clamp 40 and a grounding cable 38 extending therebetween.

When the positively charged wire electrode 22 either makes direct contact with the negatively charged workpiece 24 or the gap therebetween is sufficiently narrow, an arc is created between the wire 22 and workpiece 24, resulting in a completed circuit and causing a welding-type process to occur. In one welding-type process, i.e., arc welding, the resulting electrical current and voltage cause the wire electrode 22 and a portion of the workpiece 24 to become superheated and melt. The melted electrode 22 and workpiece 24 mix together and then cool to become permanently bonded together.

The welding machine 10 is further comprised of an automatic wire drive 26 that feeds the consumable wire electrode 22 from a supply spool 28 to the welding gun 20 when a trigger 21 is depressed. In the illustrated embodiment, the welding power output terminals 16, 18 and wire drive 26 are situated in close proximity to each other within a compartment 30 of the welding machine 10. However, other configurations exist where the wire drive 26 is located external to the welding machine 10.

The wire drive 26 receives the welding-type power via an electrically conducting cable 32 connected between the positive terminal 16 and the wire drive 26. The consumable wire electrode 22 becomes energized when passing through a power pin 31 (see FIG. 2) that is electrically coupled to the wire drive 26. The wire electrode 22 is then run inside a shielding gas hose 33 to the MIG gun 20. The hose 33, electrode 22 and a control cable 34 may be integrated into a single sheathed assembly 36 extending between the welding machine 10 and the gun 20. The grounding cable 38 is connected to the workpiece 24 via the grounding clamp 40 and the negative welding power terminal 18 via an electrical connector to provide a return path for the electrical current.

Still referring to FIG. 1, a spoolgun 42 may be connected to the welding machine 10 at the same time as the MIG gun 20. Connections between the spoolgun 42 and the welding machine 10 include a separate control cable 44, shielding gas hose 46, and power supply cable 48. Because the spoolgun 42 does not use the consumable wire electrode 22 supplied by wire drive 26, the separate power supply cable 48 is needed to supply the welding-type power from the power supply 12. In operation, a separate spool of consumable wire electrode (not shown) stored within the spoolgun 42 is energized and supplied to the workpiece 24 to effectuate a welding-type process.

To connect the spoolgun 42 to the power supply 12, the positive welding power terminal 16 must be accessed by opening the welding machine 10 to reveal the compartment 30. A wrench or similar tool is typically used to loosen a nut 50 tightened onto the terminal 16. One end of the spoolgun power cable 48, typically provided with a suitable electrical connector 17 is then fixedly fastened to the terminal 16 by tightening the nut 50 against the connector 17 as shown. The aforementioned cable 32 for the wire drive 26 is also secured to the positive output terminal 16 in a similar manner.

To disconnect the spoolgun 42 from the welding machine 10, the aforementioned process is essentially reversed. A tool is needed to loosen the nut 50 from the terminal 16 and as a result it is common practice to leave the spoolgun 42 connected to the welding machine 10 with the power cable 48 coiled up, even when not needed.

It is labor intensive and time consuming to add or remove a spoolgun 42 in this manner. Further, repeated tightening and loosening of the nut 50 may cause operational problems. For example, the nut 50 may not be tightened sufficiently and work itself loose over time. Still further, tools, such as wrenches and the like, are easily misplaced or lost resulting in time wasted while looking for a suitable tool to loosen the nut 50 from the power terminal 16. For these reasons, repeatedly connecting and disconnecting the spoolgun power supply cable 48 directly to the positive welding terminal 16 is not a desirable practice in the welding industry. Instead, many users leave the spoolgun 42 semi-permanently connected to the welding machine 10, even when not planning to use it, rather than disconnecting the spoolgun 42.

Even this practice has drawbacks, however. When a spoolgun 42 is left connected to a welding machine 10, the spoolgun power supply cable 48 is typically coiled up and stored, along with the spoolgun 42 alongside the exterior of the welding machine 10. The spoolgun 42 and power supply cable 48 are thus exposed and unprotected against environmental conditions, accidental contact with other equipment, or simply being dropped on the ground.

Therefore, a need exists for an improved apparatus and method for quickly and easily connecting and disconnecting a spoolgun to a standard welding machine without the need for tools.

Accordingly, attempts have been made to design various quick connect and release cables for spool guns. Such cables provide a quick and easy way to connect and/or disconnect a spoolgun and its associated power supply cable and gas hose. A number of prior art systems require special connectors and unique cable assemblies that cannot be used on existing welding machines.

One such prior art quick release connector mechanism is disclosed in U.S. Pat. No. 7,208,699. However, one drawback to this and similar prior art devices is that these mechanisms will not work on existing spoolguns or welding machines without substantial modifications, if at all.

Therefore, it would be desirable to have a quick-connect device for a welding machine such that a spoolgun or other welding implement may be added or removed from a welding machine without the need for tools and without the need to retrofit an existing welding machine.

BRIEF SUMMARY OF THE INVENTION

The present invention overcomes the aforementioned drawbacks with a connector that, in one embodiment, may be added to an existing welding machine with only minor modifications. Specifically and in accordance with one aspect of the present invention, a dual power pin connector is provided that electrically couples both a standard MIG welding gun and a standard spoolgun to a welding-type power supply. The connector is comprised of an electrically conductive busbar assembly having a first end fixedly connected to the positive welding power terminal and a second end fixedly connected to the wire drive of a welding machine. The connector is further comprised of an electrically conductive clamping assembly coupled to the busbar assembly. The clamping assembly can be tightened by hand to secure one end of a spoolgun power supply cable.

The connector provides welding power to the MIG welding gun through a conductive path including the busbar, the wire drive, a power pin, and a consumable wire electrode energized by contact with the power pin and delivered to the MIG gun. The connector also provides welding power to the spoolgun through a conductive path including the busbar, the clamping mechanism, a power pin, and the spoolgun power supply cable.

In accordance with another aspect of the present invention, a welding system is disclosed that includes a power source having a pair of output terminals, a first welding implement such as a MIG gun, a second welding implement such as a spoolgun, a wire drive that provides a consumable welding electrode to the first welding implement, and a dual power pin connector that connects the power source to both the wire drive and the second welding implement. The dual power pin connector has a first receptacle to electrically connect the power source to the wire drive (and thus the first welding implement). The dual power pin connector also has a second receptacle to electrically connect the power source to the second welding implement at the same time as the first implement.

In accordance with yet another aspect of the present invention, a welding machine having a wire drive comprised of an integral dual power pin connector assembly is disclosed. The integrated wire drive includes a quick release clamping assembly to simultaneously connect the power pin of a MIG gun and the power pin of a spoolgun to the wire drive. A conductive cable provides welding power from the power supply to the wire drive which in turn provides the welding power to the MIG gun via a consumable wire electrode and to the spoolgun via a power supply cable.

In accordance with still another aspect of the present invention, a method of quickly connecting or disconnecting a spoolgun to a welding machine is provided. The method includes providing a conductive dual power pin connector having a clamping assembly, securing one end of the connector to a welding power terminal, securing a second end of the connector to a wire drive that feeds a consumable wire electrode to a MIG gun, and securing one end of a spoolgun power supply cable to the connector via the clamping assembly.

Various other features of the present invention will be made apparent from the following detailed description and the drawings.

BRIEF DESCRIPTION OF THE DRAWINGS

The invention will hereafter be described with reference to the accompanying drawings, wherein like reference numerals denote like elements, and.

DETAILED DESCRIPTION OF THE INVENTION

Figure 1:
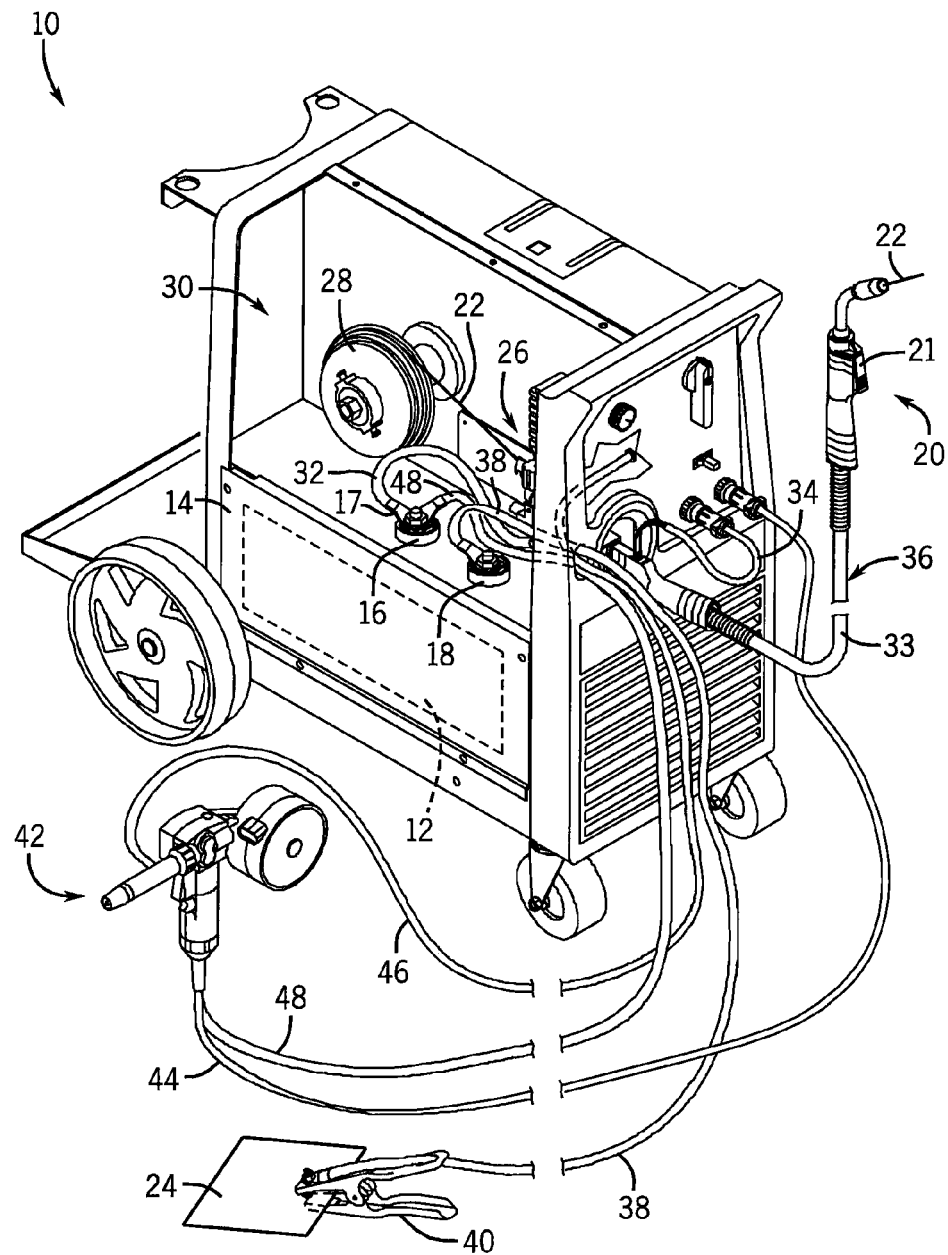
FIG. 1 is an isometric view of a MIG welding gun and a spoolgun connected to a prior-art welding machine.

While still referring to several of the components of the welding machine 10 of FIG. 1, a dual power-pin connector assembly, or power bridge, 100 is shown in FIGS. 2-5 that enables at least two welding implements to be connected to the welding machine 10 at the same time. The dual power-pin connector 100 is cast or machined from an electrically conductive material such as steel, copper, or the like. In one embodiment, the connector 100 electrically couples the positive welding power terminal 16 to a first welding implement, for example, MIG welding gun 20, via a conductive path that includes the connector 100, the automatic wire drive or feeder 26, the power pin 31 and the consumable wire electrode 22. The connector 100 also electrically couples the terminal 16 to a second welding implement, for example spoolgun 42, via a conductive path that includes the connector 100, spoolgun power pin 54 and spoolgun power supply cable 48.

According to the embodiment shown, the dual power pin connector 100 includes an electrically conductive elongated plate assembly, or busbar portion, 103 configured to extend between the positive welding power output terminal 16 and the wire drive 26. The busbar portion 103 is formed with an elongated plate, or busbar, 104 with a first securing, or mounting, leg 105 extending from one end of the busbar 104 and a second securing, or mounting, leg 107 extending away from an opposing end of the busbar 104. Both securing legs 105, 107 have holes 109, 111 formed therein to fixedly secure the busbar portion 103 with appropriate fastening means. For example, the first securing leg 105 is attached to the wire drive 26 with a bolt 113, while the second securing leg 107 is secured onto the positive welding output terminal 16 with a nut 50. The busbar portion 103 provides the aforementioned conductive path for electricity to flow from the positive welding terminal 16 to the wire drive 26, and therefore MIG welding gun 20. The connector 100 thus replaces the prior art conductive cable 32 used in the welding machine 10 and shown in FIG. 1.

The connector 100 is further comprised of an electrically conducting quick release assembly 101 extending outwardly from the busbar portion 103. The quick release assembly 101 includes a power pin receiving assembly 140 that receives the power pin 54 of a second welding implement, for example, spoolgun 42.

As shown, the power pin receiving assembly 140 is comprised of a guide/support ring 139 and a clamping ring or clamp 119. The clamping ring 119 includes a retaining passage 135 that receives a portion of the spoolgun power pin 54. The clamping ring 119 further includes a means for securely retaining the power pin 54 within the passage described in greater detail below. The guide/support ring 139, which also includes a passage 141, acts to guide the spoolgun power pin 54 into the passage 135 of the clamping ring 119. Additionally, the ring 139 acts to retain the power pin 54 within the clamping ring 119 by providing additional support against pulling forces applied to the spoolgun power supply cable 48.

Other embodiments of the connector 100 still considered within the scope of the invention may have alternative types of quick release connectors rather than the guide ring 139 and clamping ring 119 shown. These connectors include, but are not limited to, twist lock fittings such as those manufactured by Dinse, GmbH and a lug style fitting. With a twist lock fitting, a female connector coupled to the connector 100 would receive a male connector coupled to the spoolgun power supply cable 48.

Figure 2:
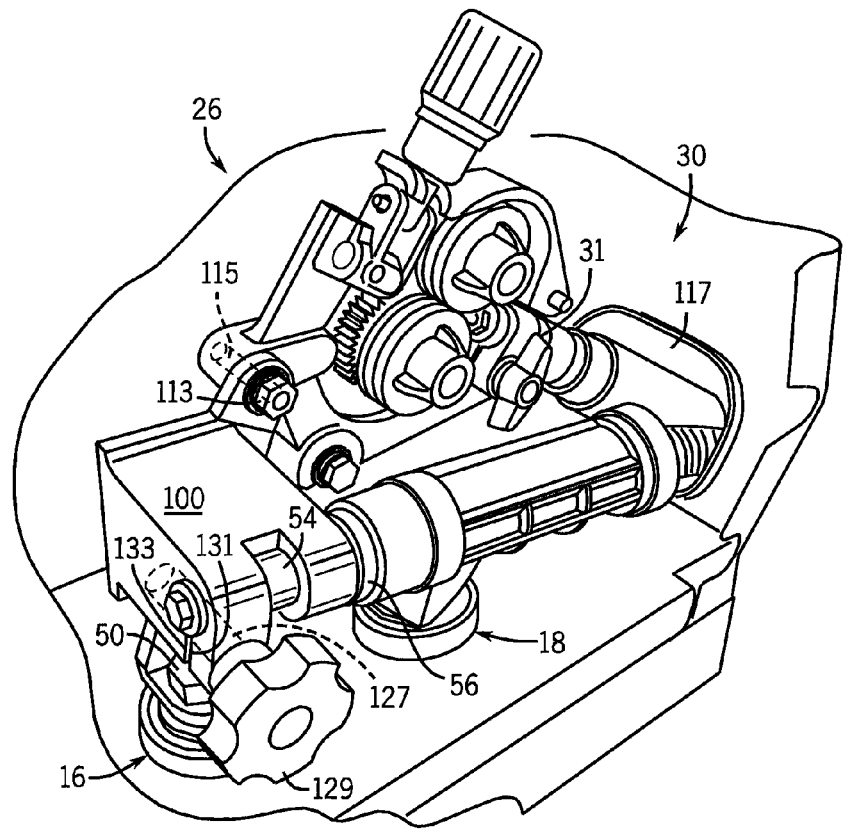
FIG. 2 is an isometric view of a dual power pin connector assembly constructed in accordance with one aspect of the present invention coupling a positive power supply terminal to a wire drive and a spoolgun power pin.
Figure 3:
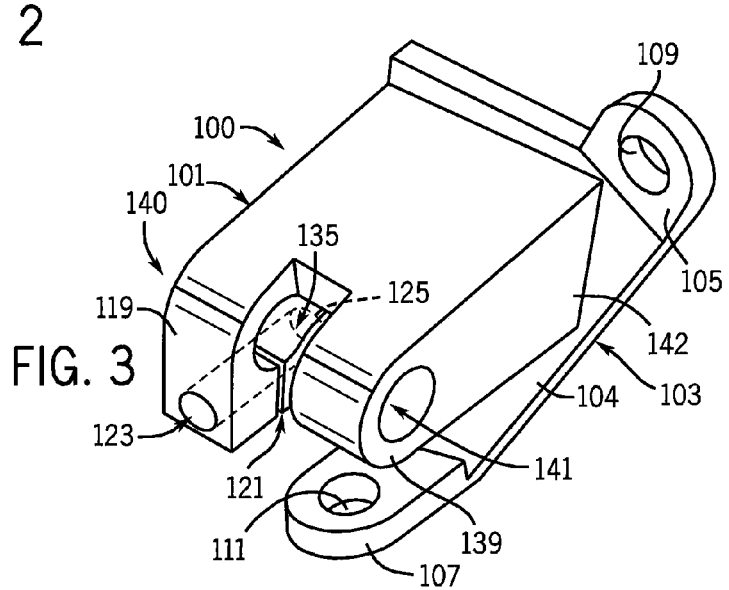
FIG. 3 is an isometric view of the body of the dual power pin connector assembly of FIG. 2.
Figure 4:
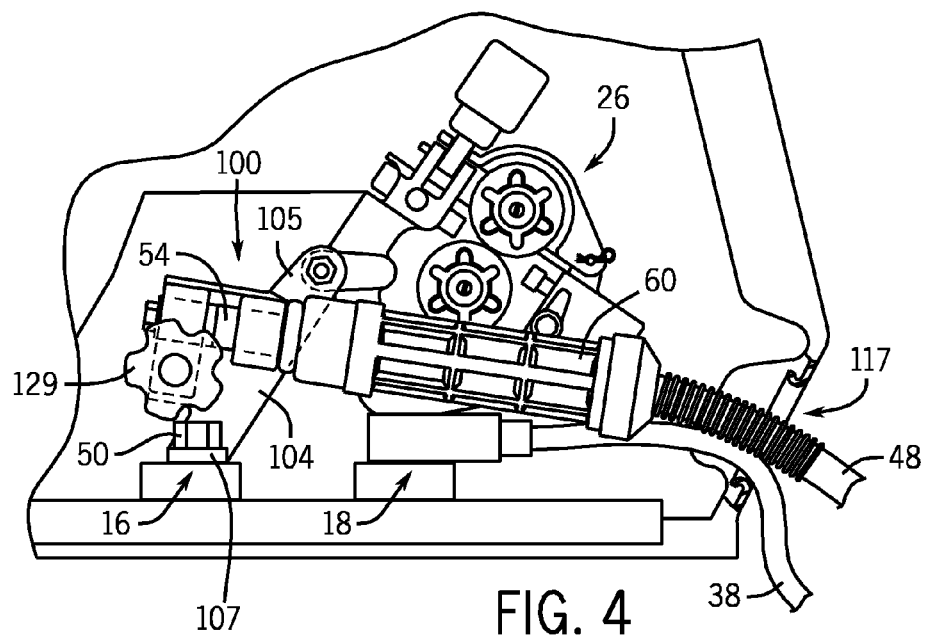
FIG. 4 is a side view of the installed dual power pin connector assembly corresponding to FIG. 2.
Figure 5:
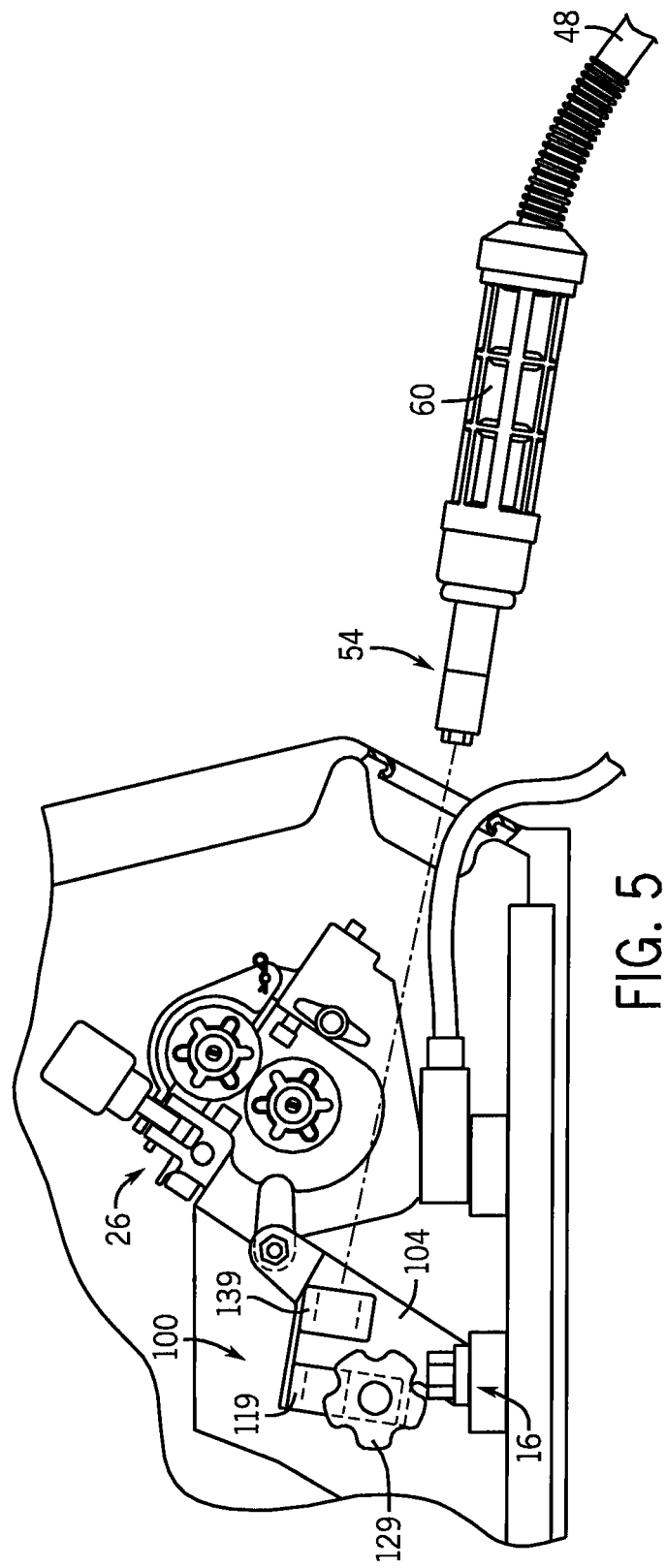
FIG. 5 is a side view corresponding to FIG. 4 and showing the spoolgun power pin removed from the dual power pin connector.

To install the dual power pin connector 100 into a standard welding machine 10 as shown in FIGS. 2, 4 and 5, the cable 32 that normally provides welding power to the wire drive 26 must be removed. The first leg 105 of the busbar portion 103 is fixedly secured to the wire drive 26 by inserting the bolt 113 through the bolt hole 109 and into a threaded passage 115 of the wire drive 26. The second leg 107 of the busbar portion 103 is fixedly secured onto the positive output power terminal 16. The connector 100 is placed such that power terminal 16 extends through the bolt hole 111 in the leg 107. The retaining nut 50 is then tightened to fixedly secure the second leg 107 to the positive welding terminal 16. Both the bolt 113 and the nut 50 are tightened such that the connector 100 will be securely retained indefinitely.

Once the connector 100 is installed as described above and after the welding machine 10 is powered up, the dual power pin connector 100 provides welding power to the MIG gun 20. Conditioned electricity produced by the welding power supply 12 flows from the positive terminal 16 to the gun 20 via a conductive path comprised of the busbar portion 103 of the connector 100, wire drive 26, MIG gun power pin 31 and consumable wire electrode 22. Wire electrode 22 is run through a bore 23 in the power pin 31 (see FIG. 6) and becomes energized through contact with the energized power pin 31.

In order to use the dual power pin connector 100 to provide welding power to the spoolgun 42, the spoolgun power pin 54, connected to spoolgun power cable 48, must be secured within the power pin receiving assembly 140. A manually operated clamping ring 119 is provided to releasably secure the spoolgun power pin 54. The spoolgun power pin 54 is inserted through the passage 141 of the guide/support ring 139 and into the passage 135 formed by the clamping ring 119. The power pin 54 is inserted until an annular shoulder 56 of the power pin 54 abuts one side 142 of the quick release assembly 101. Thereafter, the clamping ring 119 is compressed and clamped against the power pin 54 by turning the knob 129 creating a friction fit sufficient to retain the pin 54 within the receiving assembly 140.

According to the embodiment shown, the clamping ring 119 is compressible due to the presence of a gap 121 in the ring 119 extending outwardly from the passage 135. Two axially aligned passages are formed in the clamping ring 119 on opposite sides of the gap 121: a smooth passage 123 and a threaded passage 125. A threaded rod 127 coupled to the knob 129 extends completely through the smooth passage 123 and into threaded engagement with the threaded passage 125. Turning the knob 129 in a first, i.e., clockwise, direction drives the rod 127 further into the threaded passage 125, causing opposed faces 131, 133 of the gap 121 to become drawn together. This, in effect, diminishes the gap 121 and tightens the clamping ring 119 until the spoolgun power pin 54 is fully secured and retained therein.

The spoolgun 42 is thus electrically coupled to the positive output terminal 16 via a conductive path that includes the connector 100, via the busbar portion 103 and quick release assembly 101, spoolgun power pin 54 and spoolgun power supply cable 48.

To manually release the power cable 48, the knob 129 is turned in a reverse, i.e., counterclockwise, direction. Turning the knob 129 in such a direction withdraws the rod 127 from the threaded passage 125, causing the gap 121 to increase and relieving the clamping pressure against the spoolgun power pin 54. As shown in FIG. 5, the power pin 54 may then be withdrawn from the dual power pin connector 100 and through the opening 117 of the welding machine 10. The spoolgun gas supply hose 46 and control cable 44 are also disconnected by hand.

As such, the dual power pin connector 100 provides welding-type power to both the welding gun 20 (via contact with wire drive 26) and the spoolgun 42. The connector 100 further provides a quick, easy and tool-free means for connecting and disconnecting the spoolgun 42.

Figure 6:
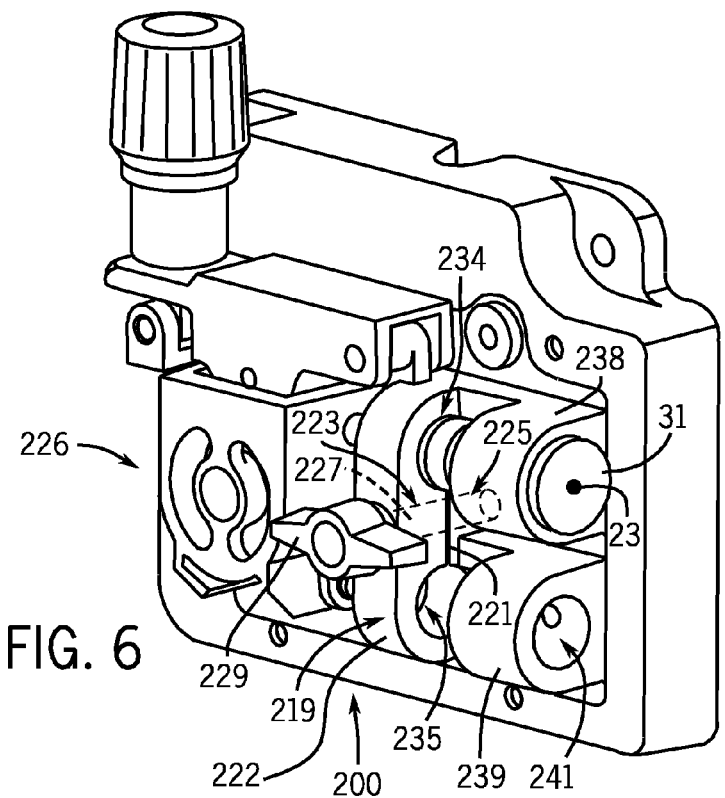
FIG. 6 is an isometric view of a dual power pin connector assembly integrated into a wire drive and constructed in accordance with another aspect of the present invention.

Referring now also to FIG. 6, another embodiment of a dual power pin connector 200 is shown. In this embodiment, the power pin connector 200 is integrated into the wire drive 226. A wire drive 226 having such an integrated power pin connector 200 may be installed within a welder such as the welding machine 10 of FIG. 1.

The function and operation of the integrated dual power pin connector 200 is similar to the connector 100 shown in FIGS. 2-5 and described above. However, the power pin connector 200 of this embodiment is not removable from the wire drive 226. Additionally, the connector 200 does not provide a conductive path for welding-type power between the positive welding output terminal 16 and the wire drive 226. Instead, a cable, such as the cable 32 shown in FIG. 1, or other conductive means is needed to electrically couple the power terminal 16 to the wire drive 226.

The power pin connector 200 is comprised of a clamping assembly 219 having a clamping portion 222. The clamping portion 222 includes two receptacles 234, 235 and a slot 221 extending between them. The connector 200 further includes two guiding support rings—a first ring 238 for the power pin 31 of a MIG welding gun 20 and a second ring 239 for the power pin 54 of a spoolgun 42. The rings 238, 239 assist in securing and retaining the pins 31, 54 as previously described with respect to the connector 100 of the first embodiment.

The receptacles 234, 235 receive and retain one end of the power pins 31, 54 respectively. A threaded rod 227 coupled to a knob 229 extends through a smooth passage 223, through the slot 221, and into a threaded passage 225 formed in the wire drive 226. As with the connector 100 of FIGS. 2-5, when the knob 229 is turned, the rod 227 is driven further into the threaded passage 225 causing the gap formed by slot 221 to diminish. The clamping assembly 219 thus becomes forcibly pressed against the power pins 31, 54 to releasably secure them within the receptacles 234, 235.

The power pins 31, 54 may be removed from the dual power pin connector 200 by turning the knob 229 in an opposite direction, thereby withdrawing the rod 227 from the threaded passage 225 and easing the clamping pressure against the pins 31, 54.

Therefore, a number of apparatus and methods for quickly connecting a spoolgun power supply cable to a welding machine are provided. By using one embodiment of the novel dual power pin connector to connect a spoolgun to a welding machine, the need for tools as in current welding machines is eliminated. Additionally, the dual power pin connector provides a semi-permanent mechanical and electrical connection between the positive power weld terminal and the wire drive to ensure that the welding machine will operate properly even in hostile working conditions.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. An integrated wire drive assembly for electrically connecting to a welding machine power source, the integrated wire drive assembly comprising:
    a clamping assembly comprised of a first receptacle configured to receive a power sin for a first welding implement, a second receptacle configured to receive a power pin for a second welding implement, a clamping portion and an at least partially threaded rod extending through a slot formed between the first receptacle and the second receptacle, the clamping assembly configured to releasably retain at least one of the power pin for the first welding implement when received by the first receptacle and the power pin for the second welding implement when received by the second receptacle; and
    wherein the clamping portion is coupled to the threaded rod such that effectuating the threaded rod in a first direction diminishes a gap defined by the slot and presses the clamping portion against at least one of the power pin for the first welding implement and the power pin for the second welding implement retainable within the first and second receptacles.

2. The integrated wire drive assembly of claim 1 wherein the first and second receptacles are at least partially defined by the clamping assembly.

3. The integrated wire drive assembly of claim 1 further comprised of at least one power pin supporting structure, the at least one power pin supporting structure having a passage formed therein, and the at least one power pin supporting structure configured to support at least one of the power pin for the first welding implement and the power pin for the second welding implement receivable within one of the first and second receptacles.

4. The integrated wire drive assembly of claim 1 further comprising a hand-operated knob coupled to the at least partially threaded rod.

5. The integrated wire drive assembly of claim 1 further comprising the first power pin received within the first receptacle and the second power pin received within the second receptacle; wherein the first welding implement is a MIG gun; and wherein the second welding implement is a spoolgun.

* * * * *

UNITED STATES PATENT AND TRADEMARK OFFICE
CERTIFICATE OF CORRECTION

PATENT NO. : 8,426,773 B2
APPLICATION NO. : 12/038550
DATED : April 23, 2013
INVENTOR(S) : Robert Willenkamp et al.

It is certified that error appears in the above-identified patent and that said Letters Patent is hereby corrected as shown below:

In the Claims:

Column 8, Claim 1, Line 20, "sin" should be --pin--.

Signed and Sealed this
Twenty-third Day of July, 2013

Teresa Stanek Rea
*Acting Director of the United States Patent and Trademark Office*